United States Patent [19]

Simmons et al.

[11] Patent Number: 4,550,519

[45] Date of Patent: Nov. 5, 1985

[54] FISHING ROD HOLDER WITH AUTOMATIC HOOK SETTER

[76] Inventors: Harold J. Simmons; Billy R. Simmons, both of P.O. Box 188, Margaret, Ala. 35112

[21] Appl. No.: 597,126

[22] Filed: Apr. 5, 1984

[51] Int. Cl.⁴ .............................................. A01K 97/10
[52] U.S. Cl. ............................................................. 43/15
[58] Field of Search ............................ 43/15, 21.2, 17

[56] References Cited

U.S. PATENT DOCUMENTS

| | | | |
|---|---|---|---|
| 2,784,517 | 3/1957 | Mooney | 43/16 |
| 3,154,875 | 11/1964 | Biddison | 43/15 |
| 3,914,894 | 10/1975 | Kobza | 43/15 |

FOREIGN PATENT DOCUMENTS 1476725  3/1967  France ................................. 43/15

*Primary Examiner*—Gene P. Crosby
*Attorney, Agent, or Firm*—Woodford R. Thompson, Jr.

[57] ABSTRACT

A fishing rod holder with automatic hook setter embodies a supporting frame having a rod holder operatively connected thereto and adapted for vertical pivotal movement. One end of a trigger rod is pivotally connected to the supporting frame with the other end of the trigger rod extending forwardly beneath a fishing rod supported by the rod holder. A fishing rod support member is carried by the forward end of the trigger rod and is movable therewith selectively to a lower inoperative position and to an upper operative, hook setting position. One end of a jerk rod is pivotally connected to the supporting frame. The other end of the jerk rod extends forwardly and is urged upwardly toward the trigger rod by a resilient member. A releasable connector assembly operatively connects the jerk rod to the trigger rod and is operable to hold the trigger rod in the inoperative position until the fishing rod support member carried thereby is moved downwardly and is then operable to release the jerk rod from the trigger rod so that it is urged upwardly to move the trigger rod and the fishing rod to the hook setting position.

11 Claims, 10 Drawing Figures

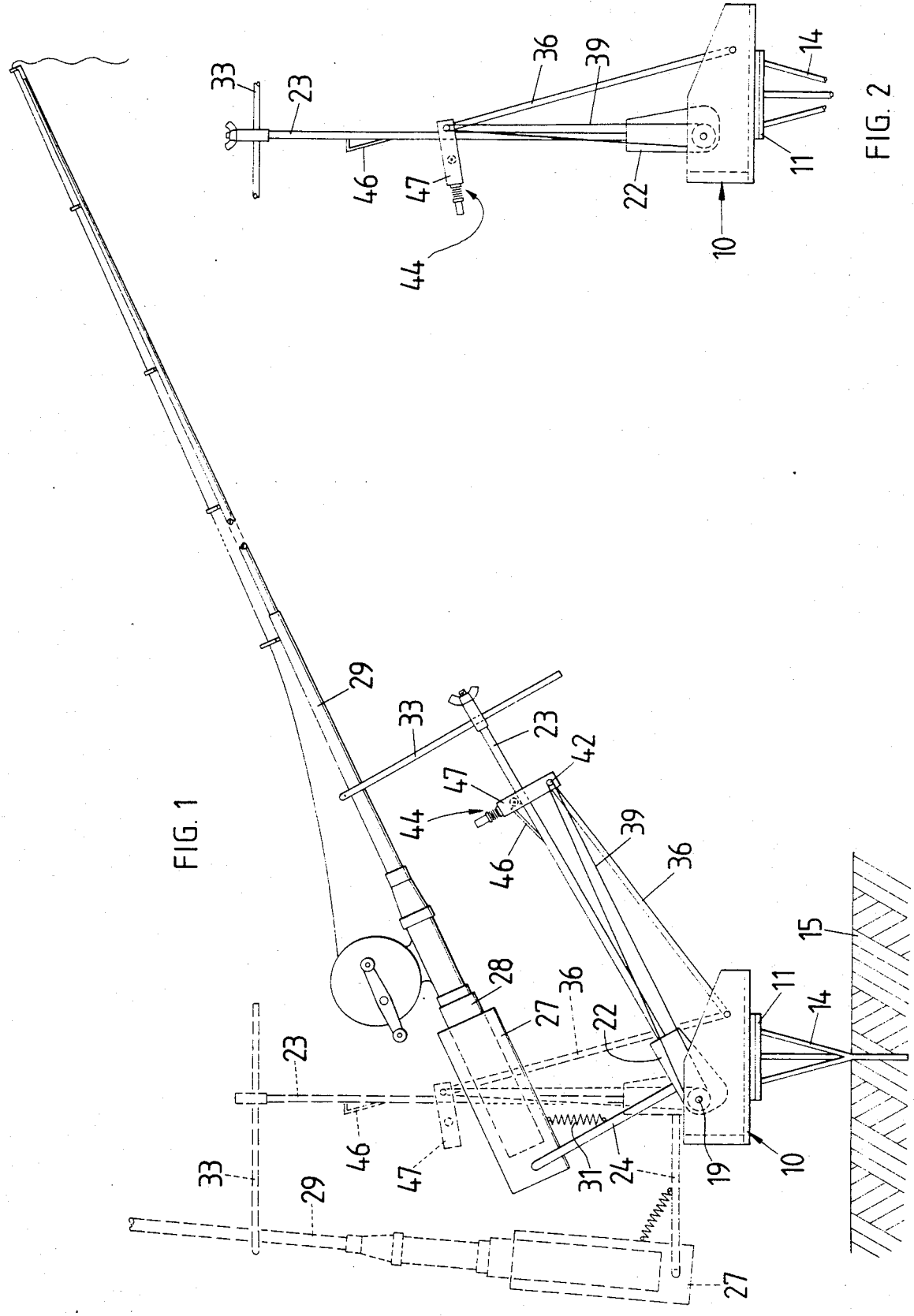

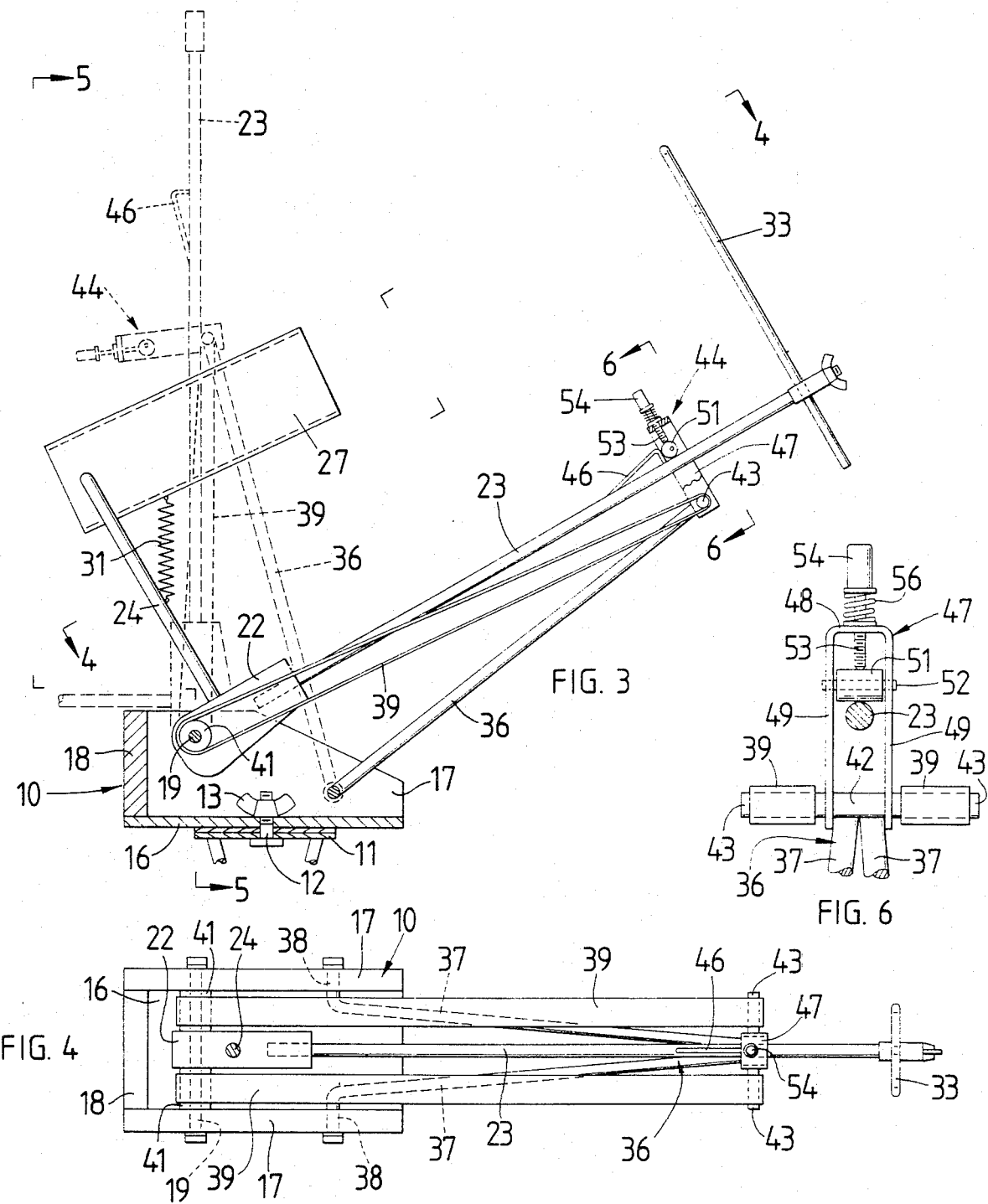

FISHING ROD HOLDER WITH AUTOMATIC HOOK SETTER

BACKGROUND OF THE INVENTION

This invention relates to a fishing rod holder with automatic hook setter and more particularly to such a device which is operable to support a fishing rod until it is moved downwardly in response to a pull on the fishing line by a fish, whereupon the front end of the fishing rod is then jerked upwardly to a hook setting position.

Heretofore in the art to which my invention relates, various devices have been proposed for moving a fish hook to a hook setting position at the time a fish strikes. However, such devices have been complicated in structure and are very difficult to operate and maintain in satisfactory working order.

BRIEF SUMMARY OF THE INVENTION

To overcome the above and other difficulties, we provide a fishing rod holder with automatic hook setter which is simple of construction, economical of manufacture, and one which is easily operated and maintained in working order with a minimum of effort.

Our improved fishing rod holder with automatic hook setter embodies a supporting frame having a rod holder supported therefrom for vertical pivotal movement and in position to support the handle end of a fishing rod. One end of a trigger rod is pivotally connected to the supporting frame with the other end of the trigger rod extending forwardly beneath the fishing rod supported by the rod holder. A fishing rod support member is carried by the forward end of the trigger rod and is movable therewith selectively to a lower inoperative position and to an upper operative position or hook setting position. A jerk rod is pivotally connected at one end to the supporting frame with the other end of the jerk rod extending forwardly and upwardly toward the trigger rod. Resilient means urges the other end of the jerk rod upwardly toward the trigger rod. A releasable connector assembly connects the jerk rod to the trigger rod and is operable to hold the trigger rod in an inoperative position until the fishing rod support member carried by the trigger rod is moved downwardly. The connector assembly is then operable to release the jerk rod from the trigger rod whereby it is urged upwardly to move the trigger rod and the fishing rod to the hook setting position.

BRIEF DESCRIPTION OF DRAWINGS

A fishing rod holder with an automatic hook setter embodying features of our invention is illustrated in the accompanying drawings, forming a part of this application, in which:

FIG. 1 is a side elevational view showing a fishing rod supported by our improved device with the fishing rod being shown in the hook setting position in dotted lines;

FIG. 2 is a side elevational view, partly broken away, showing the automatic hook setter in the hook setting position with the fishing rod holder and fishing rod being omitted, for the sake of clarity;

FIG. 3 is a side elevational view, partly broken away and in section, showing the automatic hook setter in the inoperative position in solid lines and in the operative, hook setting position in dotted lines;

FIG. 4 is a top plan view taken generally along the line 4—4 of FIG. 3;

FIG. 6 is a fragmental view, taken generally along the line 6—6 of FIG. 3;

DETAILED DESCRIPTION

Figure 5:
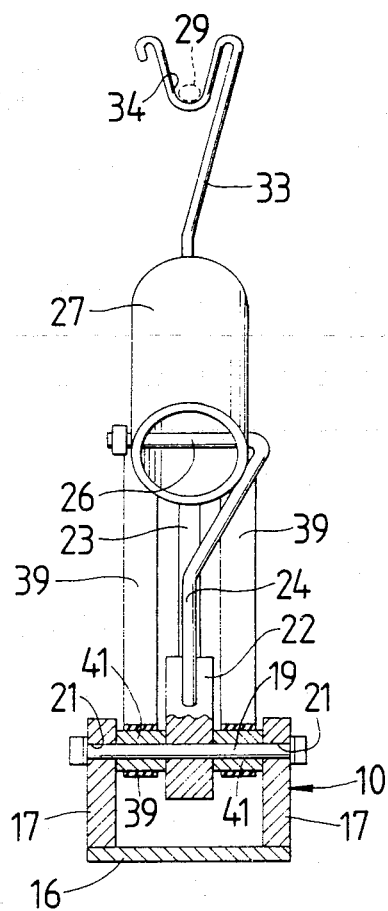
FIG. 5 is an end view, partly broken away and taken generally along the line 5—5 of FIG. 3.

Referring now to the drawings for a better understanding of our invention, we show a supporting frame 10 which is mounted for pivotal movement on a base frame 11 by a suitable pivot pin 12, as shown in FIG. 3. The pivot pin 12 is provided with a threaded upper end portion for receiving a suitable retaining element, such as a wing nut 13. The base frame 11 is shown as being mounted on a depending anchor member 14 which may be inserted into the earth 15, as shown in FIG. 1, to support the fishing rod holder adjacent a body of water. While we have shown the base frame 11 as being anchored to the ground, it will be apparent that the base member 11 could be mounted on a boat, dock or other suitable supporting structure.

As shown in FIGS. 3 and 5, the supporting frame 10 comprises a rectangular bottom wall 16 which is connected to upstanding side walls 17 and a rear wall 18. The forwardmost side of the supporting frame 10 is open, as shown. As shown in FIGS. 1, 3 and 5, a pin-like member 19 extends transversely of the supporting frame 10 with opposite ends of the pin-like member 19 projecting through suitable openings 21 provided in the upstanding side walls 17. An enlarged lower portion 22 of a trigger rod 23 is supported for pivotal movement on the transverse pin-like member 19, as shown. The enlarged portion 22 of the trigger rod 23 is preferably formed of a plastic-like material while the remaining portion of the trigger rod 23 may be formed of a suitable metal.

As shown in FIG. 5, the lower end of an upstanding support member 24 is secured to the enlarged portion 22 of the trigger rod 23 near its pivotal connection to the supporting frame 10. The upper portion of the upstanding support member 24 is in the form of a laterally extending upper end portion 26 of a length to extend horizontally through oppositely disposed aligned openings in a sleeve-like rod holder 27 which is in position to support the handle end 28 of a fishing rod 29. The transverse upper portion 26 also defines a stop which is in position to limit rearward movement of the handle end 28 of the fishing rod relative to the rod holder 27. It will thus be seen that the rod holder 27 is adapted for vertical pivotal movement relative to the upper end portion 26 of the upstanding support member 24 and is also adapted for movement with the upstanding support member 24 from the solid line position shown in FIG. 1 to the dotted line position. A suitable tension spring 31 is interposed between the rod holder 27 and the upstanding support member 24, as shown in FIG. 1, to limit free pivotal movement of the rod holder 27 after the handle portion 28 of the fishing rod is removed from the rod holder. That is, the tension spring 31 urges the rod holder 27 toward the upstanding support member 24 whereby it remains in this position until it is again moved upwardly to receive the handle portion 28 of the fishing rod.

Figure 10:
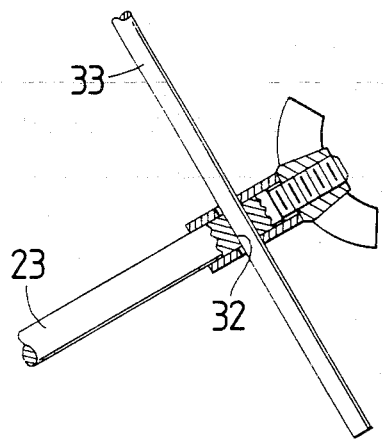

As clearly shown in FIG. 10, the forward portion of the trigger rod 23 is provided with an opening 32 therethrough for receiving an elongated fishing rod support member 33 which is in position to extend generally perpendicular to a fishing rod 29 after it is positioned within the rod holder 27. The upper portion of the elongated fishing rod support member 33 is provided with an upwardly opening recess 34 for receiving the fishing rod 29 after its handle portion 28 has been inserted into the rod holder 27, as shown in FIG. 1. The upwardly opening recess 34 may be defined by bending the elongated rodlike member 33 downwardly and then upwardly to provide a generally U-shaped recess, as clearly shown in FIG. 5. It will thus be seen that the fishing rod support member 33 is adapted to move with the trigger rod 23 selectively to a lower inoperative position and to an upper operative position so that the fishing rod supported by the rod holder 23 may be moved upwardly to a hook setting position in a manner to be described hereinafter.

As shown in FIGS. 1 and 3, a jerk rod 36 is pivotally connected at one end to the supporting frame forwardly of the pivotal connection between the trigger rod and the supporting frame with the other end of the jerk rod 36 extending forwardly and upwardly toward the trigger rod 23, as shown in FIG. 3. The jerk rod 36 is shown as comprising a pair of forwardly converging arms 37 having outturned end portions 38 which pass through suitable openings provided in the upstanding side walls 17 of the supporting frame 10. The forwardmost end of the jerk rod 36 is urged upwardly toward the trigger rod 23 by resilient means, such as a pair of elastic bands 39 which pass around suitable rollers 41 mounted on the transverse pin-like member 19 at opposite sides of the enlarged portion 22 of the trigger rod 23, as clearly shown in FIG. 5. Extending transversely of the upper ends of the jerk rod 36 is a transverse member 42 having outwardly projecting end portions 43 in position to receive the upper ends of the elastic bands 39, as shown in FIGS. 3, 4 and 6.

Figure 7:
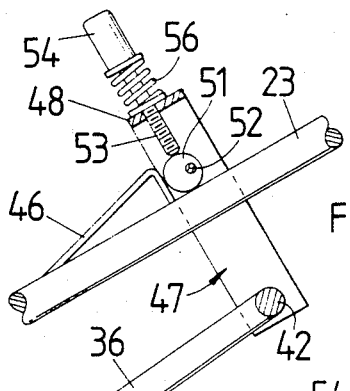
FIG. 7 is a fragmental view, partly broken away and in section, showing the releasable connector assembly which operatively connects the jerk rod to the trigger rod and showing the cam roller in an intermediate position with its pivot pin positioned above the trigger rod a distance equal the radius of the cam roller.
Figure 8:
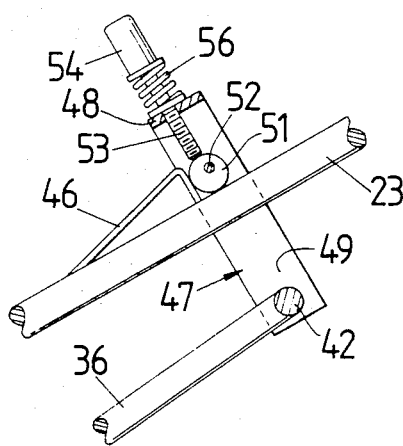
FIG. 8 is a fragmental view corresponding to FIG. 7 showing the cam roller at a high sensitivity position wherein its pivot pin is located above the trigger rod a distance greater than the radius of the cam roller.
Figure 9:
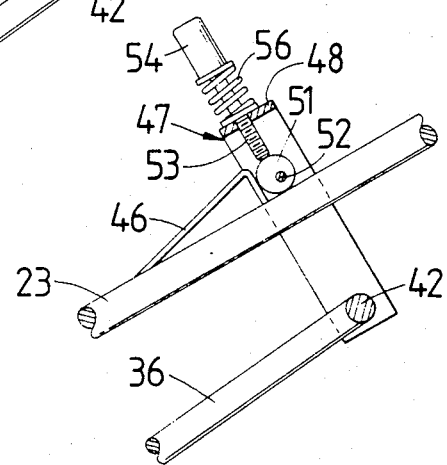
FIG. 9 is a view corresponding to FIGS. 7 and 8 showing the cam roller at a low sensitivity position with the pivot pin of the cam roller located above the trigger rod a distance less than the radius of the cam roller; and, FIG. 10 is a fragmental view, partly broken away and in section, showing the means for adjustably connecting the fishing rod support member to the forward end portion of the trigger rod.

Releasable means indicated generally at 44 is operable to connect the upper, forwardmost end of the jerk rod 36 to the trigger rod 23 in position to hold the trigger rod 23 and the fishing rod support member 33 carried thereby in an inoperative position and operable to release the jerk rod for movement relative to the trigger rod in response to the downward movement of the forwardmost end of the trigger rod by downward movement of the fishing rod support member 33 so that the jerk rod is urged by the resilient means in a direction to move the trigger rod 23 and the fishing rod 29 supported by the fishing rod support member to a hook setting position. As shown in FIGS. 3 and 6-9, the releasable means operable to connect the forward end of the jerk rod 36 to the trigger rod 23 is shown as comprising an upstanding trigger element 46 carried by the trigger rod 23 adjacent the uppermost end of the trigger rod and spaced rearwardly of the fishing rod support member 33, as shown in FIG. 3. An inverted U-shaped member 47 having a base 48 and depending legs 49 is carried by the forwardmost end of the jerk rod 36, as shown. The depending legs 49 extend along opposite sides of the trigger rod 23, as shown in FIG. 6, with the lower ends of the depending legs being secured to the forwardmost end of the jerk rod 36. As shown in FIGS. 6-9, a cam roller 51 is eccentrically mounted for rotation between the depending legs 49 on a transverse pin 52 located above the trigger rod 23 in position to move selectively to a first position adjacent the forward side of the trigger element 46 to restrain upward movement of the jerk rod 36 and to a second position above the trigger element 46 to release the forwardmost end of the jerk rod 36 for upward movement into engagement with the trigger rod 23 to move the trigger rod upwardly to its operative position so that the fishing rod supported by the rod holder 33 is moved upwardly to the hook setting position. The cam roller 51 is held at selected angular positions to vary the sensitivity of the release of the cam roller 51 from the trigger element by a threaded member 53 which passes vertically through a suitable threaded opening provided in the base 48 of the U-shaped member 47. The threaded member 53 is in position for its lower end to move selectively toward and away from the cam roller to position the cam roller at selected angular positions, as shown in FIGS. 7, 8 and 9. A suitable knob 54 is secured to the upper end of the threaded member 53 whereby it may be rotated in opposite directions to move the lower end of the threaded member selectively toward and away from the cam roller 51. As shown in FIGS. 7, 8 and 9, the cam roller 51 is mounted eccentrically on its pin-like member 52 and a compression spring 56 is located between the knob 54 and the base 48 of the U-shaped member 47 to retain the threaded member 53 at selected vertical positions relative to the cam roller 51. It will thus be seen that the more the threaded member 53 is moved toward the cam roller 51, the easier it is to release the releasable trigger element. That is, with the cam roller in the intermediate position shown in FIG. 7, the pivot pin 52 is positioned above the trigger rod a distance equal substantially the radius of the cam roller whereby a moderate amount of downward force on the fishing rod 29 will release the trigger mechanism.

To increase the sensitivity of the trigger mechanism, the knob 54 is rotated in a direction to move the threaded member 53 downwardly toward the cam roller 51 to the position shown in FIG. 8 whereby the pivot pin 52 is then located above the trigger rod a distance greater than the radius of the cam roller.

To lower the sensitivity of the trigger mechanism, the knob 54 is rotated in a direction to move the threaded member 53 upwardly relative to the cam 51 to the position shown in FIG. 9 whereby the pivot pin 52 of the cam roller 51 is located above the trigger rod a distance less than the radius of the cam roller.

From the foregoing description, the operation of our improved fishing rod holder will be readily understood. The supporting frame 10 is secured to a suitable supporting structure, such as by inserting the anchor member 14 into the ground 15. The trigger rod 23 and the jerk rod 36 are then moved downwardly in a clockwise direction, as viewed in FIGS. 1 and 2 whereby the trigger rod and jerk rod are moved from the position shown in FIG. 2 to the solid line position shown in FIGS. 1 and 3. As the cam roller 51 is moved upwardly over the trigger element 46, the inverted U-shaped member 47 is pressed downwardly which causes the cam roller 51 to rotate about its pivot pin 52 to the position shown in FIG. 7 as it moves over the forwardmost end of the trigger element 46. The knob 54 is then rotated in the desired direction to either increase or decrease the sensitivity of the trigger release means, as described hereinabove. That is, by rotating the knob 54 to vary the sensivitity of the release means, the amount of downward force on the fishing rod support member 33 to release the trigger mechanism may be readily varied. After a fish strikes the hook carried by the fishing line attached to the fishing rod, the tip of the fishing rod is moved downwardly whereupon force is then exerted through the fishing rod support member 33 to the trigger rod 23 whereupon the cam roller then moves over the top of the trigger element 46 to release the jerk rod 36 for pivotal movement upwardly into engagement with the trigger to thus move the fishing rod 29 from the solid line position to the dotted line position shown in FIG. 1. That is, the jerk rod 36 and the trigger rod 23 move from the solid line position shown in FIG. 1 to the position shown in FIG. 2. Accordingly, the fishing rod 29 is moved upwardly to the hook setting position as shown in dotted lines in FIG. 1. To reset the fishing rod holder and its automatic hook setting means, the above procedure is repeated.

From the foregoing, it will be seen that we have devised an improved fishing rod holder with automatic hook setter which is extremely simple of construction, economical of manufacture and one which may be operated and maintained with a minimum of effort.

While we have shown our invention in but one form, it will be obvious to those skilled in the art that it is not so limited, but is susceptible of various changes and modifications without departing from the spirit thereof.

What we claim is:

1. A fishing rod holder with automatic hook setter comprising:
    (a) a supporting frame,
    (b) a rod holder operatively connected to said supporting frame in position to support the handle end of a fishing rod and adapted for vertical pivotal movement relative to said supporting frame,
    (c) a trigger rod pivotally connected at one end to said supporting frame with the other end of said trigger rod being adapted to extend forwardly beneath a fishing rod supported by said rod holder,
    (d) a fishing rod support member carried by a forward portion of said trigger rod in position to support a fishing rod and move with said trigger rod selectively to a lower inoperative position and to an upper operative position so that the fishing rod supported by said rod holder is moved upwardly to a hook setting position,
    (e) a jerk rod pivotally connected at one end to said supporting frame forwardly of the pivotal connection between said one end of said trigger rod and said supporting frame with the other end of said jerk rod extending forwardly and upwardly toward said trigger rod,
    (f) resilient means urging said other end of said jerk rod upwardly toward said trigger rod,
    (g) releasable means operable to connect said other end of said jerk rod to said trigger rod in a position to hold said trigger rod and said fishing rod support member carried thereby in said inoperative position and operable to release said jerk rod for movement relative to said trigger rod in response to downward movement of said other end of said trigger rod by downward movement of said fishing rod support member so that said jerk rod is urged by said resilient means in a direction to move said trigger rod and the fishing rod supported by said fishing rod support member to said hook setting position.

2. A fishing rod holder with automatic hook setter as defined in claim 1 in which said supporting frame is mounted for pivotal movement on a base frame.

3. A fishing rod holder with automatic hook setter as defined in claim 1 in which said rod holder is a sleeve-like member pivotally connected to the upper portion of an upstanding support member with the lower portion of said upstanding support member being secured to said trigger rod adjacent its pivotal connection to said supporting frame.

4. A fishing rod holder with automatic hook setter as defined in claim 3 in which said upstanding support member is a rod-like member having a laterally extending upper end portion of a length to extend horizontally through oppositely disposed aligned openings in said sleeve-like member to define a pivot support for said sleeve-like member and a stop in position to limit rearward movement of said handle end of a fishing rod relative to said sleeve-like member.

5. A fishing rod holder with automatic hook setter as defined in claim 1 in which said fishing rod support member comprises an elongated member extending generally perpendicular to said trigger rod and adjustably connected thereto with the upper portion of said elongated member being provided with an upwardly opening recess for receiving the fishing rod.

6. A fishing rod holder with automatic hook setter as defined in claim 1 in which said resilient means urging said other end of said jerk rod upwardly toward said trigger rod comprises at least one resilient member operatively connected at one end to said other end of said jerk rod with the other end of said resilient member being operatively connected to said supporting frame.

7. A fishing rod holder with automatic hook setter as defined in claim 6 in which said resilient member is an elastic member.

8. A fishing rod holder with automatic hook setter as defined in claim 6 in which at least one lateral projection is carried by said other end of said jerk rod in position to be connected to one end of said resilient member with the other end of said resilient member connected to a transverse member carried by said supporting frame.

9. A fishing rod holder with automatic hook setter as defined in claim 1 in which said releasable means operable to connect said other end of said jerk rod to said trigger rod comprises:
    (a) an upstanding trigger element carried by said trigger rod adjacent said other end thereof and spaced rearwardly of said fishing rod support member,
    (b) an inverted U-shaped member having a base connected to spaced apart depending legs which extend along opposite sides of said trigger rod with the lower ends of said depending legs secured to said other end of said jerk rod, (c) a cam roller eccentrically mounted for rotation between said depending legs and extending transversely above said trigger rod in position to move selectively to a first position adjacent the forward side of said trigger element to restrain upward movement of said jerk rod and to a second position above said trigger element to release said other end of said jerk rod for upward movement into engagement with said trigger rod to move said trigger rod upwardly to said operative position so that the fishing rod supported by said rod holder is moved upwardly to said hook setting position, and (d) means to hold said cam roller at selected angular positions to vary the sensitivity of the release of said cam roller from said trigger element.

10. A fishing rod holder with automatic hook setter as defined in claim 9 in which said means to hold said cam roller at selected angular positions comprises:

(a) a depending threaded member in threaded engagement with a threaded opening through said base in position for the lower end of said threaded member to move selectively toward and away from said cam roller to position said cam roller at said selected angular positions, and (b) means to rotate said threaded member in opposite directions to move said lower end thereof selectively toward and away from said cam roller.

11. A fishing rod holder with automatic hook setter as defined in claim 9 in which said cam roller is mounted eccentrically on a pin-like member extending between and supported by said depending legs of said U-shaped member.

* * * * *